United States Patent
Takano

(10) Patent No.: US 8,982,864 B2
(45) Date of Patent: Mar. 17, 2015

(54) BASE STATION, COMMUNICATION SYSTEM, MOBILE TERMINAL, AND RELAY DEVICE FOR ALLOCATING UPLINK AND DOWNLINK COMMUNICATION RESOURCES

(75) Inventor: Hiroaki Takano, Tokyo (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 13/375,786

(22) PCT Filed: Jun. 10, 2010

(86) PCT No.: PCT/JP2010/059851
§ 371 (c)(1), (2), (4) Date: Dec. 2, 2011

(87) PCT Pub. No.: WO2011/010514
PCT Pub. Date: Jan. 27, 2011

(65) Prior Publication Data
US 2012/0076070 A1    Mar. 29, 2012

(30) Foreign Application Priority Data
Jul. 23, 2009 (JP) ................. 2009-172491

(51) Int. Cl.
*H04W 4/00* (2009.01)
*H04W 72/04* (2009.01)
*H04L 5/00* (2006.01)
*H04B 7/155* (2006.01)
*H04B 7/26* (2006.01)
*H04W 84/04* (2009.01)

(52) U.S. Cl.
CPC ............. *H04W 72/04* (2013.01); *H04L 5/0005* (2013.01); *H04L 5/0037* (2013.01); *H04B 7/155* (2013.01); *H04B 7/2606* (2013.01); *H04W 84/047* (2013.01)
USPC .......................................................... 370/341

(58) Field of Classification Search
CPC ..... H04W 84/12; H04W 84/18; H04W 88/08; H04W 76/02; H04W 72/04; H04W 80/04
USPC .............. 370/310, 310.2, 313, 315, 328, 329, 370/330, 341
See application file for complete search history.

(56) References Cited

U.S. PATENT DOCUMENTS

| | | | |
|---|---|---|---|
| 8,274,923 B2 * | 9/2012 | Shen et al. | 370/315 |
| 2008/0159217 A1 * | 7/2008 | Chang et al. | 370/329 |

FOREIGN PATENT DOCUMENTS

| | | |
|---|---|---|
| CN | 1964225 A | 5/2007 |
| JP | 2002 271845 | 9/2002 |

(Continued)

OTHER PUBLICATIONS

U.S. Appl. No. 13/383,590, filed Jan. 12, 2012, Takano.

(Continued)

*Primary Examiner* — Anh Ngoc Nguyen
(74) *Attorney, Agent, or Firm* — Oblon, McClelland, Maier & Neustadt, L.L.P.

(57) ABSTRACT

A base station including an allocation unit for allocating the downlink of the relay link or the access link and the downlink of the direct link to a resource block included in a same resource block group, and allocating the uplink of the relay link or the access link and the uplink of the direct link to a resource block included in a same resource block group.

7 Claims, 12 Drawing Sheets

(56) References Cited

FOREIGN PATENT DOCUMENTS

| JP | 2008 177969 | 7/2008 |
|---|---|---|
| WO | 2009 072191 | 6/2009 |

OTHER PUBLICATIONS

Japanese Office Action issued Mar. 19, 2013, in Japan Patent Application No. 2009-172491.

3GPP TSG RAN WGI Meeting #55 R1-084232, "Discussion on the TD relay and FD relay for the FDD system," Panasonic, pp. 1-6 (Nov. 10-14, 2008).

International Search Report Issued Spetember 7, 2010 in PCT/JP10/59851 Filed Jun. 10, 2010.

Combined Chinese Office Action and Search Report issued Dec. 25, 2013 in Patent Application No. 201080031515.8 with English Translation.

Chinese Office Action issued Sep. 9, 2014, in China Patent Application No. 201080031515.8 (with English translation).

\* cited by examiner

US 8,982,864 B2

BASE STATION, COMMUNICATION SYSTEM, MOBILE TERMINAL, AND RELAY DEVICE FOR ALLOCATING UPLINK AND DOWNLINK COMMUNICATION RESOURCES

TECHNICAL FIELD

The present invention relates to a base station, a communication system, a mobile terminal, and a relay device.

BACKGROUND ART

In 3GPP (Third Generation Partnership Project), a technology that uses a relay device (relay station) to realize an increase in the throughput at the cell edge is being actively considered.

This relay device receives, in a downlink, a signal transmitted from a base station, amplifies the same, and then transmits the amplified signal to a mobile terminal. By performing such relaying, the relay device can increase the signal-to-noise ratio than when directly transmitting a signal from the base station to the mobile terminal. Similarly, in an uplink, the relay device can maintain high signal-to-noise ratio by relaying a signal transmitted from the mobile terminal to the base station. Additionally, such relaying by the relay device is described in Non-Patent Literature 1, for example.

Furthermore, as a relay scheme of the relay device, an Amp-Forward type, a Decode-Forward type, and the like can be cited. The Amp-Forward type is a scheme of amplifying and transmitting a received signal while keeping it as an analogue signal. According to this Amp-Forward type, although the signal-to-noise ratio is not improved, there is an advantage that the communication protocol does not have to be refined. Additionally, the relay device has a feedback path between a transmission antenna and a reception antenna, and is designed such that the feedback path does not oscillate.

The Decode-Forward type is a scheme of converting a received signal to a digital signal by AD conversion, performing decoding such as error correction on the digital signal, encoding again the decoded digital signal, converting the digital signal to an analogue signal by DA conversion, amplifying the analogue signal, and transmitting the same. According to the Decode-Forward type, the signal-to-noise ratio can be improved by a coding gain. Also, by storing a digital signal obtained by reception in a memory and transmitting the digital signal in the next time slot, the relay device can avoid oscillation of a feedback path between a transmission antenna and a reception antenna. Additionally, the relay device is also capable of avoiding the oscillation by changing the frequency instead of the time slot.

CITATION LIST

Non-Patent Literature

Non-Patent Literature 1: Panasonic, "Discussion on the TD relay and FD relay for FDD system", Nov. 10-14, 2008

SUMMARY OF INVENTION

Technical Problem

However, in addition to a communication path going through the relay device described above, there is also a communication path by which the base station and the mobile terminal communicate without the relay device. Accordingly, a case is assumable where interference is caused between the communication path going through the relay device and the communication path not going through the relay device.

Accordingly, the present invention is made in view of the above problem, and the object of the present invention is to provide a base station, a communication system, a mobile terminal, and a relay device which are novel and improved, and which are capable of sharing communication resources between a communication path going through a relay device and a communication path not going through a relay device.

Solution to Problem

According to an aspect of the present invention, in order to achieve the above-mentioned object, there is provided a base station including a communication unit for communicating with a mobile terminal via a relay link between the base station and a relay device and an access link between the relay device and the mobile terminal, or a direct link between the base station and the mobile terminal, and an allocation unit for allocating an uplink and a downlink of each of the relay link, the access link, and the direct link to resource blocks included in any of a plurality of resource block groups, where the allocation unit allocates the downlink of the relay link or the access link and the downlink of the direct link to a resource block included in a same resource block group, and allocates the uplink of the relay link or the access link and the uplink of the direct link to a resource block included in a same resource block group.

A first resource block group for the downlink of the relay link, a second resource block group for the downlink of the access link, a third resource block group for the uplink of the access link, and a fourth resource block group for the uplink of the relay link may be different in at least time or frequency.

The first resource block group may be same in frequency but different in time from the second resource block group, and may be same in time but different in frequency from the third resource block group, and the fourth resource block group may be same in time but different in frequency from the second resource block group, and may be same in frequency but different in time from the third resource block group.

The first resource block group may be same in frequency but different in time from the second resource block group, and may be same in time but different in frequency from the fourth resource block group, and the third resource block group may be same in time but different in frequency from the second resource block group, and may be same in frequency but different in time from the fourth resource block group.

The first resource block group may be same in frequency but different in time from the fourth resource block group, and may be same in time but different in frequency from the third resource block group, and the second resource block group may be same in time but different in frequency from the fourth resource block group, and may be same in frequency but different in time from the third resource block group.

The first resource block group may be same in frequency but different in time from the third resource block group, and may be same in time but different in frequency from the fourth resource block group, and the second resource block group may be same in time but different in frequency from the third resource block group, and may be same in frequency but different in time from the fourth resource block group.

The first resource block group may be same in frequency but different in time from the third resource block group, and may be same in time but different in frequency from the second resource block group, and the fourth resource block group may be same in time but different in frequency from the third resource block group, and may be same in frequency but different in time from the second resource block group.

The first resource block group may be same in frequency but different in time from the fourth resource block group, and may be same in time but different in frequency from the second resource block group, and the third resource block group may be same in time but different in frequency from the fourth resource block group, and may be same in frequency but different in time from the second resource block group.

The first resource block group, the second resource block group, the third resource block group, and the fourth resource block group may be same in time but different in frequency.

The first resource block group, the second resource block group, the third resource block group, and the fourth resource block group may be same in frequency but different in time.

According to another aspect of the present invention, in order to achieve the above-mentioned object, there is provided a communication system including a mobile terminal, a relay device, and a base station including a communication unit for communicating with the mobile terminal via a relay link between the base station and the relay device and an access link between the relay device and the mobile terminal, or a direct link between the base station and the mobile terminal, and an allocation unit for allocating an uplink and a downlink of each of the relay link, the access link, and the direct link to resource blocks included in any of a plurality of resource block groups, where the allocation unit allocates the downlink of the relay link or the access link and the downlink of the direct link to a resource block included in a same resource block group, and allocates the uplink of the relay link or the access link and the uplink of the direct link to a resource block included in a same resource block group.

According to another aspect of the present invention, in order to achieve the above-mentioned object, there is provided a mobile terminal. The mobile terminal communicates with a base station using a resource block allocated by an allocation unit, the base station including a communication unit for communicating with the mobile terminal via a relay link between the base station and a relay device and an access link between the relay device and the mobile terminal, or a direct link between the base station and the mobile terminal, and the allocation unit for allocating an uplink and a downlink of each of the relay link, the access link, and the direct link to resource blocks included in any of a plurality of resource block groups, where the allocation unit allocates the downlink of the relay link or the access link and the downlink of the direct link to a resource block included in a same resource block group, and allocates the uplink of the relay link or the access link and the uplink of the direct link to a resource block included in a same resource block group.

According to another aspect of the present invention, in order to achieve the above-mentioned object, there is provided a relay device. The relay device relays communication between a base station and a mobile terminal using a resource block allocated by an allocation unit, the base station including a communication unit for communicating with the mobile terminal via a relay link between the base station and the relay device and an access link between the relay device and the mobile terminal, or a direct link between the base station and the mobile terminal, and the allocation unit for allocating an uplink and a downlink of each of the relay link, the access link, and the direct link to resource blocks included in any of a plurality of resource block groups, where the allocation unit allocates the downlink of the relay link or, the access link and the downlink of the direct link to a resource block included in a same resource block group, and allocates the uplink of the relay link or the access link and the uplink of the direct link to a resource block included in a same resource block group.

Advantageous Effects of Invention

As described above, according to the present invention, communication resources can be shared between a communication path going through a relay device and a communication path not going through a relay device.

DESCRIPTION OF EMBODIMENTS

Figure 1:
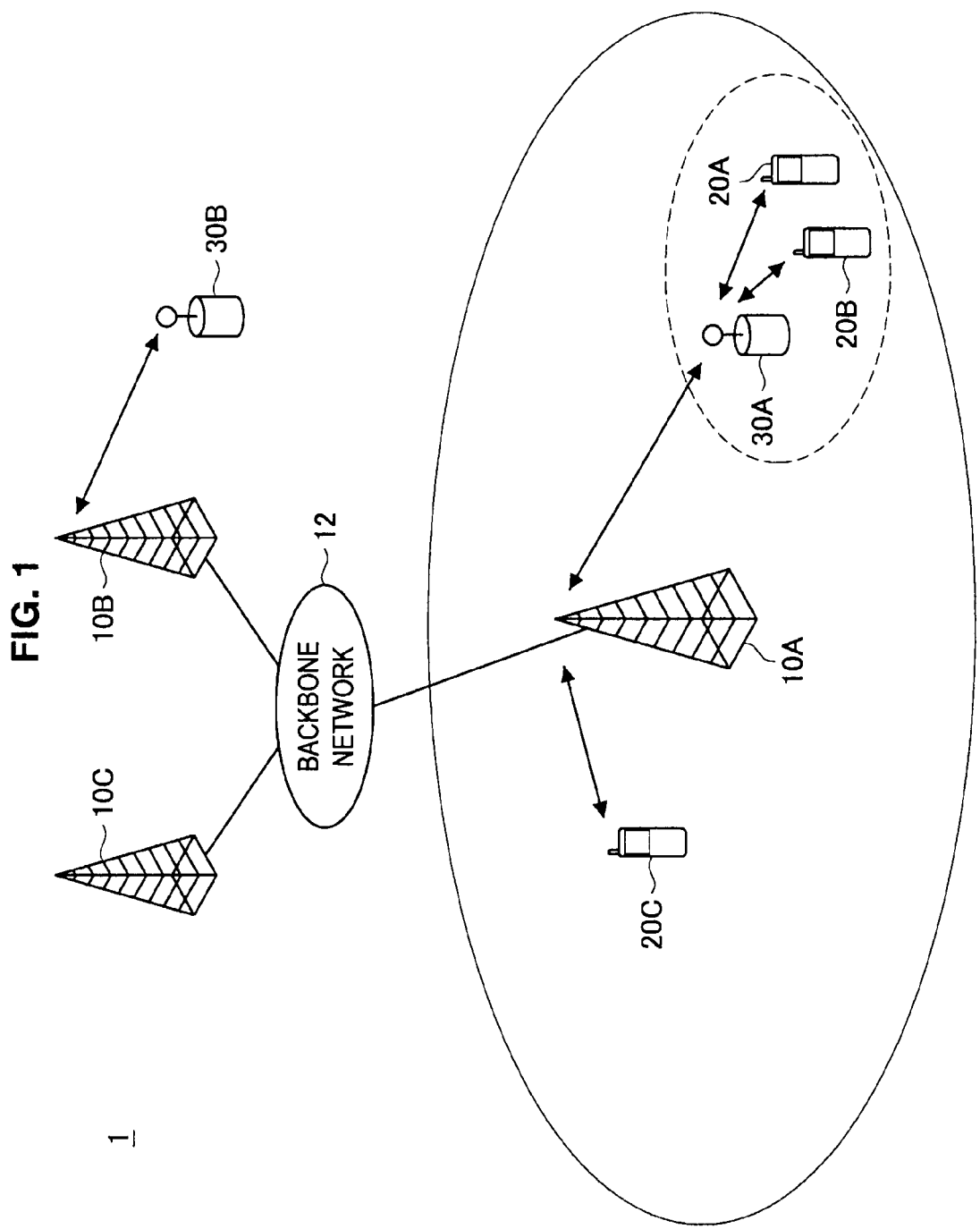
FIG. 1 is an explanatory diagram showing a configuration of a communication system according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, in this specification and the drawings, a plurality of structural elements having substantially the same functional configuration may be distinguished from each other by each having a different letter added to the same reference numeral. For example, a plurality of elements having substantially the same functional configuration are distinguished from each other as necessary as mobile terminals 20A, 20B, and 20C. However, if it is not particularly necessary to distinguish each of a plurality of structural elements having substantially the same functional configuration, only the same reference numeral is assigned. For example, if it is not particularly necessary to distinguish between the mobile terminals 20A, 20B, and 20C, they are simply referred to as the mobile terminal 20.

Furthermore, the "Description of Embodiments" will be described according to the following item order.

1. Overview of Communication System
    2. Configuration of Mobile Terminal
    3. Configuration of Relay Device
    4. Configuration of Base Station
    5. Operation of Base Station
    6. Summary <1. Overview of Communication System>

First, a communication system 1 according to an embodiment of the present invention will be briefly described with reference to FIGS. 1 to 3. FIG. 1 is an explanatory diagram showing the configuration of the communication system 1 according to the embodiment of the present invention. As shown in FIG. 1, the communication system 1 according to the embodiment of the present invention includes a plurality of base stations 10A, 10B, and 10C, a backbone network 12, a plurality of mobile terminals 20A, 20B, and 20C, and a plurality of relay devices 30A and 30B.

The plurality of base stations 10A, 10B, and 10C manage schedule information for communicating with the mobile terminals 20 that are present in their radio wave coverages. The plurality of base stations 10A, 10B, and 10C communicate with the mobile terminals 20 present in their radio wave coverages according to the schedule information. For example, the base station 10A manages schedule information on frequency-time for communicating with the mobile terminal 20C present in the radio wave coverage of the base station 10A. The base station 10A communicates with the mobile terminal 20C present in the radio wave coverage of the base station 10A according to the schedule information described above.

Also, the plurality of base stations 10A, 10B, and 10C are also capable of communicating with the mobile terminals 20 via relay devices 30 present in their radio wave coverages. In this case, the plurality of base stations 10A, 10B, and 10C manage schedule information for communicating with the relay devices 30, and schedule information for the relay devices 30 and the mobile terminals 20 to communicate with each other. For example, the base station 10A manages schedule information on frequency-time for communicating with a relay device 30A present in the radio wave coverage of the base station 10A, and manages schedule information on frequency-time for the relay device 30A and the mobile terminals 20A and 20B to communicate with each other. The base station 10A communicates with the relay device 30A according to the schedule information described above.

Additionally, in the present specification, an explanation will be given placing emphasis on a case where frequency-time schedule management is performed by the base station 10, but the present invention is not limited to such an example. For example, the frequency-time schedule management may be performed by the base station 10 and the relay device 30 working in cooperation with each other, or may be performed by the base station 10, the relay device 30, and the mobile terminal 20 working in cooperation with each other, or may be performed by the relay device 30.

Furthermore, the plurality of base stations 10A, 10B, and 10C are connected via the backbone network 12. The plurality of base stations 10A, 10B, and 10C are capable of exchanging the schedule information that each manages via this backbone network 12, for example.

The relay device 30 relays the communication between the base station 10 and the mobile terminal 20 according to the schedule information on frequency-time managed by the base station 10. Specifically, in the downlink, the relay device 30 receives a signal transmitted from the base station 10, and transmits the amplified signal to the mobile terminal 20 using the frequency-time that is according to the schedule information. By performing such relaying, the relay device 30 can increase the signal-to-noise ratio than when directly transmitting the signal from the base station 10 to the mobile terminal 20 near the cell edge.

Similarly, also in the uplink, the relay device 30 relays a signal transmitted from the mobile terminal 20 to the base station 10 according to the schedule information on frequency-time managed by the base station 10, and thereby maintains a high signal-to-noise ratio. Additionally, an example is shown in FIG. 1 where only the relay device 30A is present in the cell provided by the base station 10A, but a plurality of relay devices 30 may be present in the cell provided by the base station 10A. Link names will now be organized with reference to FIG. 2.

Figure 2:
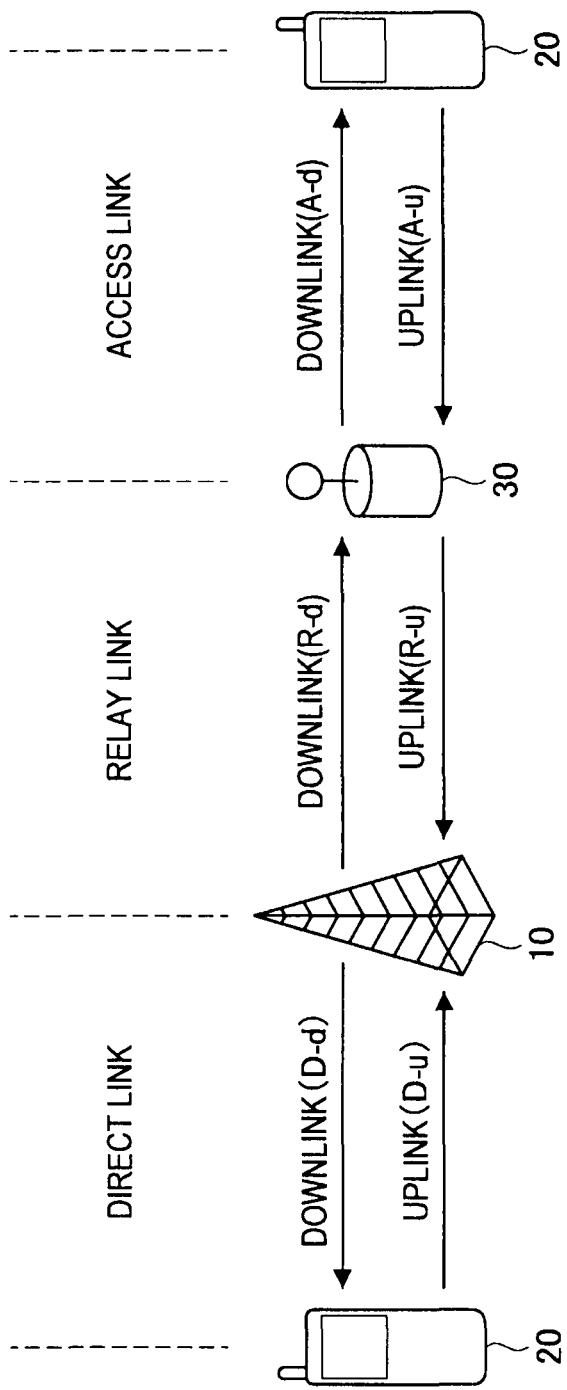
FIG. 2 is an explanatory diagram showing each link in the communication system according to the embodiment of the present invention.
Figure 3:
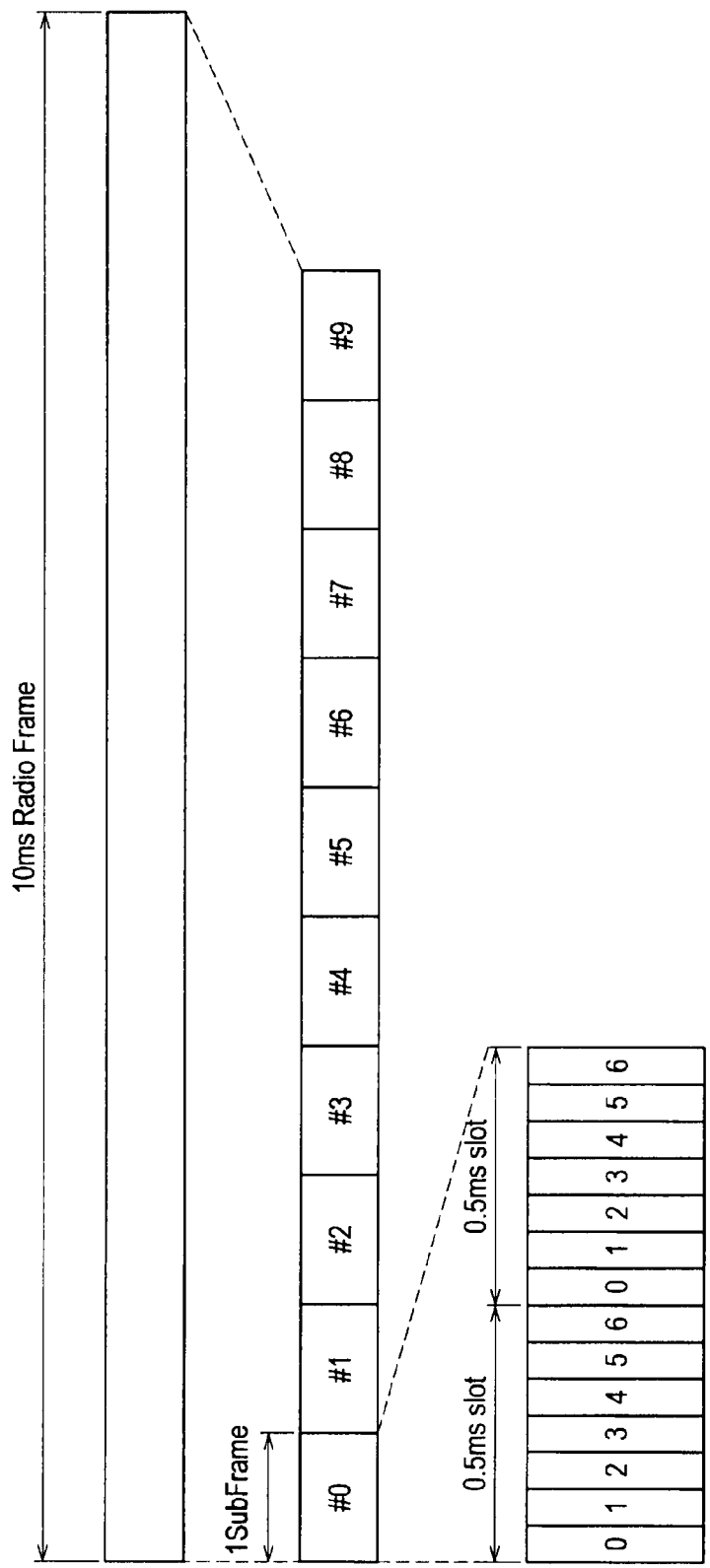
FIG. 3 is an explanatory diagram showing an example configuration of a radio frame used in the communication system according to the embodiment.

FIG. 2 is an explanatory diagram showing each link in the communication system 1 according to the embodiment of the present invention. As shown in FIG. 2, a direct communication path between the base station 10 and the mobile terminal 20 is referred to as a direct link. Also, the downlink of this direct link is referred to as a direct downlink (D-d), and the uplink of this direct link is referred to as a direct uplink (D-u).

Also, the communication path between the base station 10 and the relay device 30 is referred to as a relay link, and the downlink of this relay link is referred to as a relay downlink (R-d), and the uplink of this relay link is referred to as a relay uplink (R-u). Furthermore, the communication path between the relay device 30 and the mobile terminal 20 is referred to as an access link, and the downlink of this access link is referred to as an access downlink (A-d), and the uplink of this access link is referred to as an access uplink (A-u).

The communication system 1 will be again described with reference to FIG. 1. As described above, the mobile terminal 20 included in the communication system 1 communicates with the base station 10 directly or via the relay device 30, according to the schedule information managed by the base station 10. Additionally, as the data to be transmitted/received by the mobile terminal 20, audio data, music data such as music, a lecture, a radio program, or the like, still image data such as a photograph, a document, a painting, a diagram, or the like, video data such as a movie, a television program, a video program, a game image, or the like, may be cited.

Now, the configuration of a radio frame used in the communication system 1 according to the present embodiment will be described with reference to FIG. 3. FIG. 3 is an explanatory diagram showing an example configuration of a radio frame used in the communication system 1 according to the present embodiment. As shown in FIG. 3, the length of each radio frame is 10 ms. Also, each radio frame is formed from ten subframes #0 to #9 whose lengths are 1 ms. Also, each subframe is formed from two 0.5 ms slots, and each 0.5 ms slot is formed from seven OFDM (orthogonal frequency division multiplexing) symbols.

Also, the fifth and sixth OFDM symbols of the first 0.5ms slots included in the subframes #0 and #5 are used for transmission of reference signals for synchronization. The mobile terminal 20 performs a cell search and a synchronization process based on this reference signal transmitted from the base station 10 or the relay device 30.

Additionally, the base station 10 allots time on a per-0.5 ms slot basis for communication with the mobile terminal 20.

Furthermore, to separate the uplink and the downlink, FDD (Frequency Division Duplex) and TDD (Time Division Duplex) are used. In the case of TDD, it is possible to select for each subframe whether to use the subframe for uplink or downlink.

<2. Configuration of Mobile Terminal>

Figure 4:
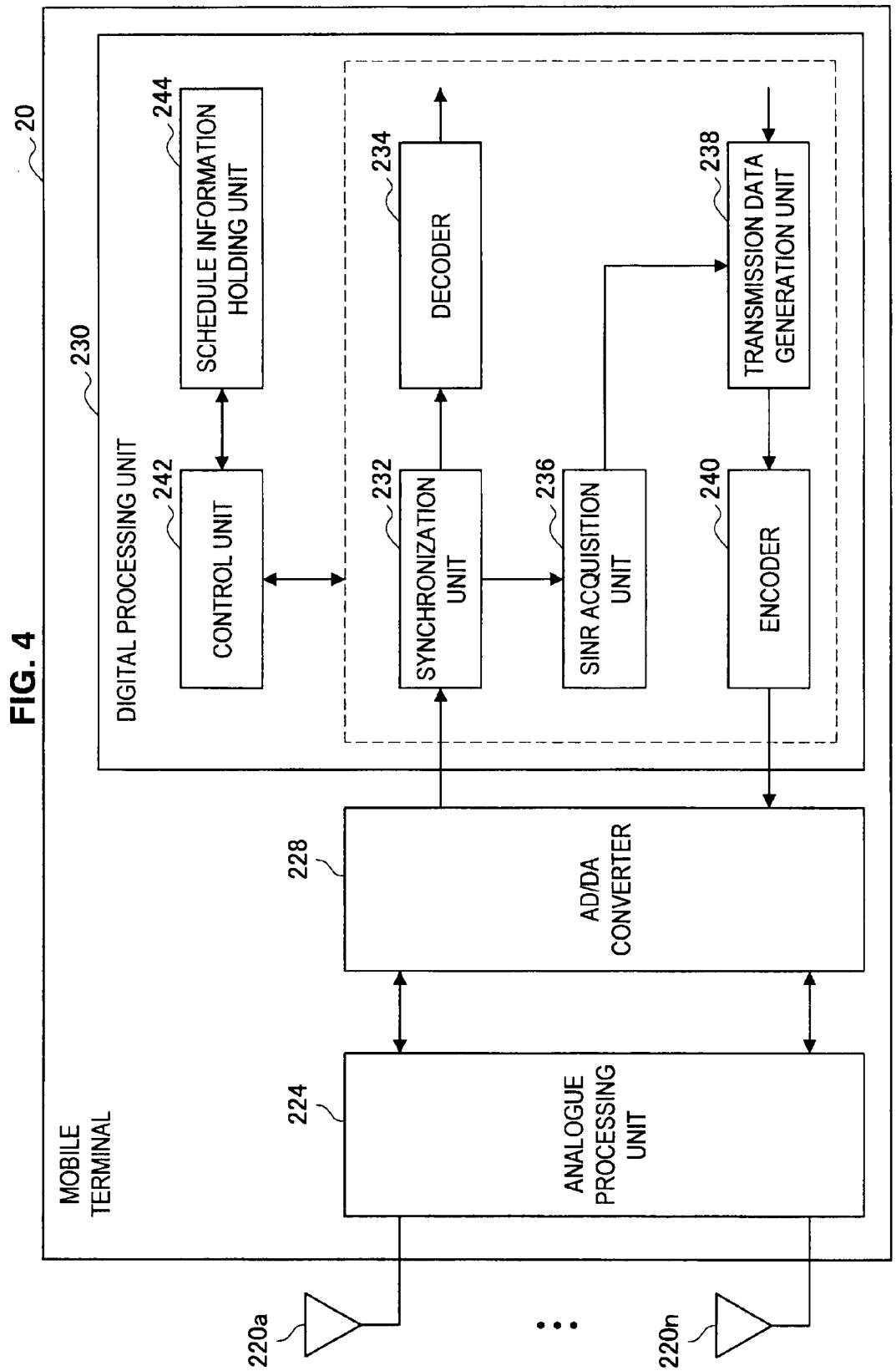
FIG. 4 is a functional block diagram showing a configuration of a mobile terminal.

In the foregoing, the communication system 1 according to the present embodiment has been briefly described with reference to FIGS. 1 to 3. Next, the configuration of the mobile terminal 20 included in the communication system 1 according to the present embodiment will be described with reference to FIG. 4. FIG. 4 is a functional block diagram showing the configuration of the mobile terminal 20. As shown in FIG. 4, the mobile terminal 20 includes a plurality of antennas 220a to 220n, an analogue processing unit 224, an AD/DA converter 228, and a digital processing unit 230.

Each of the plurality of antennas 220a to 220n receives a radio signal from the base station 10 or the relay device 30 and acquires an electrical high-frequency signal, and supplies the high-frequency signal to the analogue processing unit 224. Also, each of the plurality of antennas 220a to 220n transmits a radio signal to the base station 10 or the relay device 30 based on the high-frequency signal supplied from the analogue processing unit 224. Since the mobile terminal 20 is provided with the plurality of antennas 220a to 220n as described, it is capable of performing MIMO (Multiple Input Multiple Output) communication or diversity communication.

The analogue processing unit 224 converts the high-frequency signals supplied from the plurality of antennas 220a to 220n into baseband signals by performing analogue processing such as amplification, filtering, down-conversion, or the like. Also, the analogue processing unit 224 converts a baseband signal supplied from the AD/DA converter 228 into a high-frequency signal.

The AD/DA converter 228 converts the analogue baseband signal supplied from the analogue processing unit 224 into a digital format, and supplies the same to the digital processing unit 230. Also, the AD/DA converter 228 converts a digital baseband signal supplied from the digital processing unit 230 into an analogue format, and supplies the same to the analogue processing unit 224.

The digital processing unit 230 includes a synchronization unit 232, a decoder 234, a SINR (Signal to Interference plus Noise Ratio) acquisition unit 236, a transmission data generation unit 238, an encoder 240, a control unit 242, and a schedule information holding unit 244. Among these, the synchronization unit 232, the decoder 234, the encoder 240, and the like function, together with the plurality of antennas 220a to 220n, the analogue processing unit 224, and the AD/DA converter 228, as a communication unit for communicating with the base station 10 and the relay device 30.

The synchronization unit 232 is supplied, from the AD/DA converter 228, with a reference signal transmitted from the base station 10 or the relay device 30, and performs a synchronization process of a radio frame based on the reference signal. Specifically, the synchronization unit 232 performs synchronization of the radio frame by computing the correlation between the reference signal and a known sequence pattern and detecting the peak position of the correlation.

The decoder 234 decodes a baseband signal supplied from the AD/DA converter 228 and obtains received data. Additionally, the decoding may include a MIMO reception process and an OFDM demodulation process, for example.

The SINR acquisition unit 236 acquires the level of SINR with respect to the relay device 30 from the correlation of the reference signal obtained by the synchronization unit 232.

Here, each relay device 30 transmits a reference signal having any of a plurality of sequence patterns. Therefore, the SINR acquisition unit 236 can acquire the SINR for each relay device 30 based on the difference between the sequence patterns of the reference signals.

The transmission data generation unit 238 is supplied, from the SINR acquisition unit 236, with information indicating the SINR of each relay device 30, and generates transmission data including the information and supplies the same to the encoder 240.

The encoder 240 encodes the transmission data supplied from the transmission data generation unit 238, and supplies the same to the AD/DA converter 228. Additionally, the encoding may include a MIMO transmission process and an OFDM demodulation process, for example.

The control unit 242 controls transmission processing and reception processing at the mobile terminal 20 according to the schedule information held in the schedule information holding unit 244. For example, the mobile terminal 20 performs, based on the control of the control unit 242, transmission processing and reception processing using resource blocks indicated by the schedule information.

The schedule information holding unit 244 holds the schedule information managed by the base station 10. This schedule information indicates a resource block to be used for the access downlink or a resource block to be used for the access uplink, for example.

Additionally, the schedule information of the uplink and the downlink is included in a PDCH (Physical Downlink Control Channel) which is a downlink control channel. Also, this PDCH is transmitted using the first one to three OFDM symbols of a subframe, in the radio frame, allocated to the downlink.

<3. Configuration of Relay Device>

Figure 5:
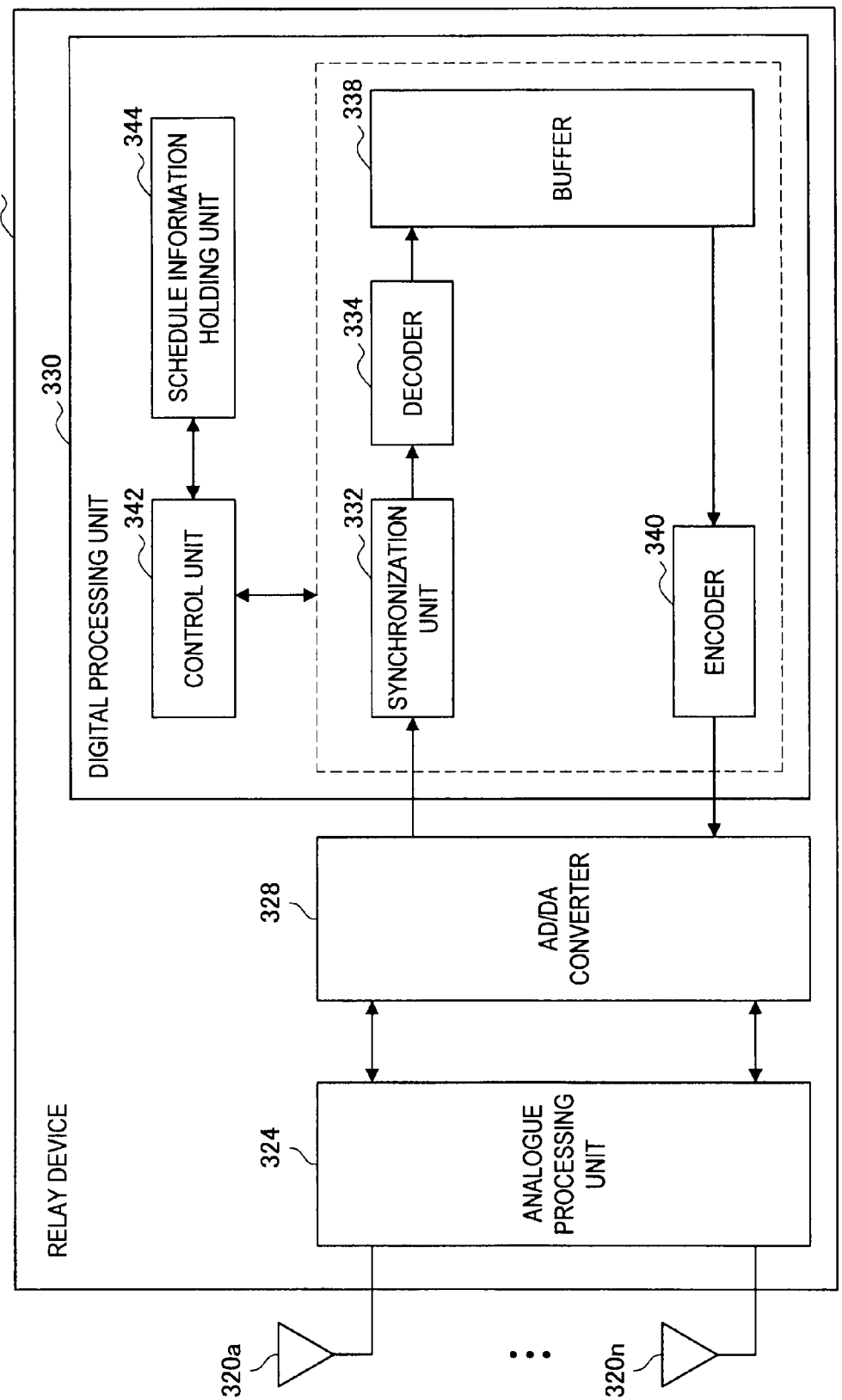
FIG. 5 is a functional block diagram showing a configuration of a relay device.

Next, the configuration of the relay device 30 will be described with reference to FIG. 5. FIG. 5 is a functional block diagram showing the configuration of the relay device 30. As shown in FIG. 5, the relay device 30 includes a plurality of antennas 320a to 320n, an analogue processing unit 324, an AD/DA converter 328, and a digital processing unit 330.

Each of the plurality of antennas 320a to 320n receives a radio signal from the base station 10 or the mobile terminal 20 and acquires an electrical high-frequency signal, and supplies the high-frequency signal to the analogue processing unit 324. Also, each of the plurality of antennas 320a to 320n transmits a radio signal to the base station 10 or the mobile terminal 20 based on the high-frequency signal supplied from the analogue processing unit 324. Since the relay device 30 is provided with the plurality of antennas 320a to 320n as described, it is capable of performing MIMO communication or diversity communication.

The analogue processing unit 324 converts the high-frequency signals supplied from the plurality of antennas 320a to 320n into baseband signals by performing analogue processing such as amplification, filtering, down-conversion, or the like. Also, the analogue processing unit 324 converts a baseband signal supplied from the AD/DA converter 328 into a high-frequency signal.

The AD/DA converter 328 converts the analogue baseband signal supplied from the analogue processing unit 324 into a digital format, and supplies the same to the digital processing unit 330. Also, the AD/DA converter 328 converts a digital baseband signal supplied from the digital processing unit 330 into an analogue format, and supplies the same to the analogue processing unit 324.

The digital processing unit 330 includes a synchronization unit 332, a decoder 334, a buffer 338, an encoder 340, a control unit 342, and a schedule information holding unit 344. Among these, the synchronization unit 332, the decoder 334, the encoder 340, and the like function, together with the plurality of antennas 320a to 320n, the analogue processing unit 324, and the AD/DA converter 328, as a communication unit for communicating with the base station 10 and the mobile terminal 20.

The synchronization unit 332 is supplied, from the AD/DA converter 328, with a reference signal transmitted from the base station 10, and performs a synchronization process of a radio frame based on the reference signal. Specifically, the synchronization unit 332 performs synchronization of the radio frame by computing the correlation between the reference signal and a known sequence pattern and detecting the peak position of the correlation.

The decoder 334 decodes a baseband signal supplied from the AD/DA converter 328 and obtains relay data for the base station 10 or the mobile terminal 20. Additionally, the decoding may include a MIMO reception process, an OFDM demodulation process, an error correction process, and the like, for example.

The buffer 338 temporarily holds the relay data, obtained by the decoder 334, for the base station 10 or the mobile terminal 20. Then, the relay data for the mobile terminal 20 is read out, by the control of the control unit 342, from the buffer 338 to the encoder 340 in the transmission time of the access downlink to the mobile terminal 20. Likewise, the relay data for the base station 10 is read out, by the control of the control unit 342, from the buffer 338 to the encoder 340 in the transmission time of the relay uplink to the base station 10.

The encoder 340 encodes the data supplied from the buffer 338, and supplies the same to the AD/DA converter 328. Additionally, the encoding may include a MIMO transmission process and an OFDM demodulation process, for example.

The control unit 342 controls transmission processing and reception processing at the relay device 30 according to the schedule information held in the schedule information holding unit 344. For example, the relay device 30 performs, based on the control of the control unit 342, transmission processing and reception processing using resource blocks indicated by the schedule information.

The schedule information holding unit 344 holds the schedule information managed by the base station 10. This schedule information indicates resource blocks to be used respectively for the relay downlink, the access downlink, the access uplink, and the relay uplink, for example.

<4. Configuration of Base Station>

Next, the configuration of the base station 10 will be described with reference to FIGS. 6 to 16.

Figure 6:
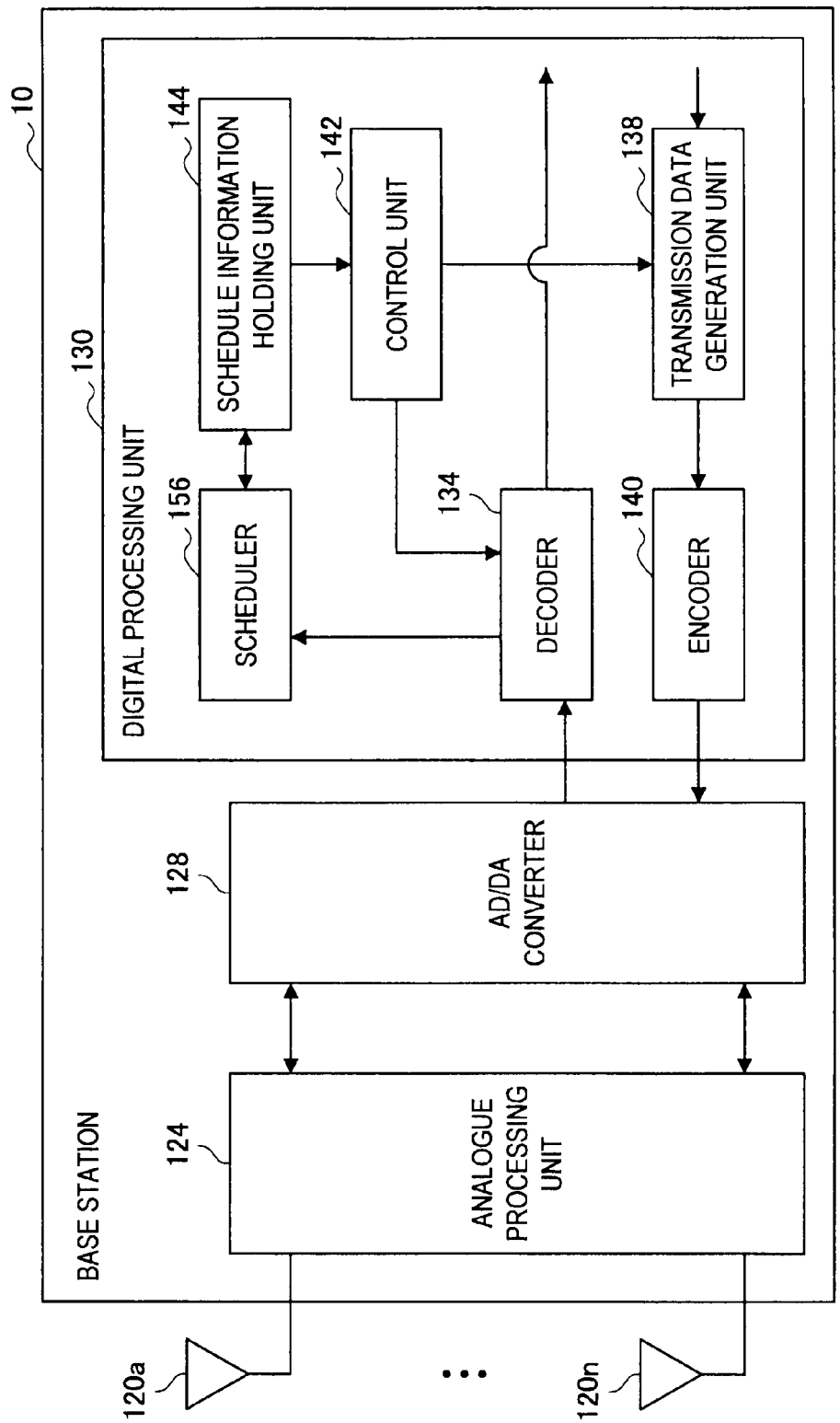
FIG. 6 is a functional block diagram showing a configuration of a base station.

FIG. 6 is a functional block diagram showing the configuration of the base station 10. As shown in FIG. 6, the base station 10 includes a plurality of antennas 120a to 120n, an analogue processing unit 124, an AD/DA converter 128, and a digital processing unit 130.

Each of the plurality of antennas 120a to 120n receives a radio signal from the relay device 30 or the mobile terminal 20 and acquires an electrical high-frequency signal, and supplies the high-frequency signal to the analogue processing unit 124. Also, each of the plurality of antennas 120a to 120n transmits a radio signal to the relay device 30 or the mobile terminal 20 based on the high-frequency signal supplied from the analogue processing unit 124. Since the base station 10 is provided with the plurality of antennas 120a to 120n as described, it is capable of performing MIMO communication or diversity communication.

The analogue processing unit 124 converts the high-frequency signals supplied from the plurality of antennas 120a to 120n into baseband signals by performing analogue processing such as amplification, filtering, down-conversion, or the like. Also, the analogue processing unit 124 converts a baseband signal supplied from the AD/DA converter 128 into a high-frequency signal.

The AD/DA converter 128 converts the analogue baseband signal supplied from the analogue processing unit 124 into a digital format, and supplies the same to the digital processing unit 130. Also, the AD/DA converter 128 converts a digital baseband signal supplied from the digital processing unit 130 into an analogue format, and supplies the same to the analogue processing unit 124.

The digital processing unit 130 includes a decoder 134, a transmission data generation unit 138, an encoder 140, a control unit 142, a schedule information holding unit 144, and a scheduler 156. Among these, the decoder 134, the encoder 140, and the like function, together with the plurality of antennas 120a to 120n, the analogue processing unit 124, and the AD/DA converter 128, as a communication unit for communicating with the relay device 30 and the mobile terminal 20.

The decoder 134 decodes a baseband signal supplied from the AD/DA converter 128 and obtains received data. Additionally, the decoding may include a MIMO reception process, an OFDM demodulation process, an error correction process, and the like, for example.

The transmission data generation unit 138 generates transmission data including schedule information scheduled by the scheduler 156. Additionally, the schedule information is included in the PDCH arranged at the beginning of the subframes as described above.

The encoder 140 encodes the transmission data supplied from the transmission data generation unit 138, and supplies the same to the AD/DA converter 128. Additionally, the encoding may include a MIMO transmission process and an OFDM demodulation process, for example.

The control unit 142 controls transmission processing and reception processing at the base station 10 according to the schedule information held in the schedule information holding unit 144. For example, the base station 10 performs, based on the control of the control unit 142, transmission processing and reception processing using resource blocks indicated by the schedule information.

The schedule information holding unit 144 holds the schedule information determined by the scheduler 156.

The scheduler 156 (allocation unit) schedules relay link communication with the relay device 30, access link communication between the relay device 30 and the mobile terminal 20, and direct link communication with the mobile terminal 20.

More particularly, the scheduler 156 performs resource allocation for the relay downlink, the access downlink, the access uplink, the relay uplink, the direct downlink, and the direct uplink according to one of a plurality of allocation patterns.

For example, the scheduler 156 allocates to the relay downlink, the access downlink, the access uplink and the relay uplink resource blocks included in different resource block groups. Also, the scheduler 156 allocates the direct uplink to a resource block included in the same resource block group as the relay uplink or the access uplink. Similarly, the scheduler 156 allocates the direct downlink to a resource block included in the same resource block group as the relay downlink or the access downlink. In the following, the allocation pattern for each link by the scheduler 156 will be specifically described with reference to FIG. 7 and subsequent drawings.

(Allocation Pattern 1)

Figure 7:
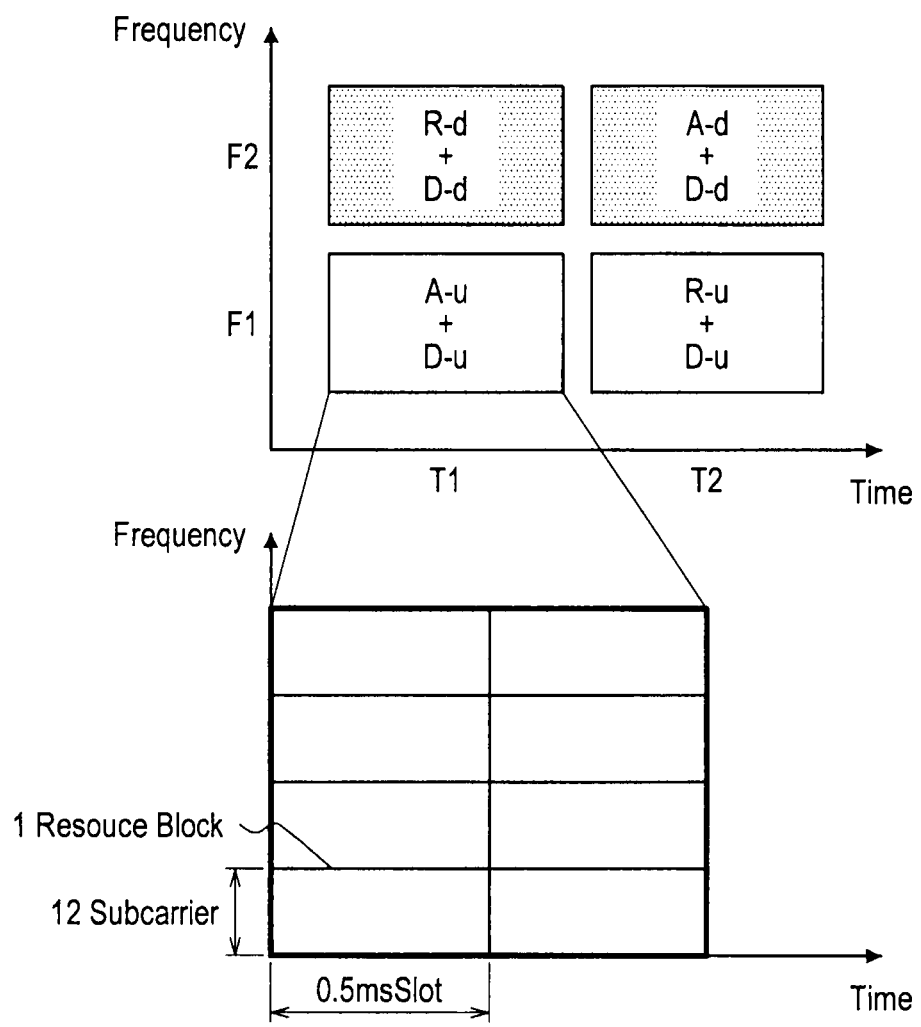
FIG. 7 is an explanatory diagram showing an allocation pattern 1 for each link.

FIG. 7 is an explanatory diagram showing an allocation pattern 1 for each link. As shown in FIG. 7, according to the allocation pattern 1, the relay downlink (R-d) is allocated to a resource block group defined by frequency F2-time T1, the access downlink (A-d) is allocated to a resource block group defined by frequency F2-time T2, the access uplink (A-u) is allocated to a resource block group defined by frequency F1-time T1, and the relay uplink (R-u) is allocated to a resource block group defined by frequency F1-time T2.

According to this allocation pattern 1, the base station 10 transmits data to the relay device 30 via the relay downlink in a resource block included in the resource block group defined by frequency F2-time T1. Then, the relay device 30 receives the data transmitted via the relay downlink, holds it in the buffer 338 as relay data, and then transmits the relay data to the mobile terminal 20 via the access downlink in a resource block included in the resource block group defined by frequency F2-time T2.

Also, the mobile terminal 20 transmits data to the relay device 30 via the access uplink in a resource block included in the resource block group defined by frequency F1-time T1. Then, the relay device 30 receives the data transmitted via the access uplink, holds it in the buffer 338 as relay data, and then transmits the relay data to the base station 10 via the relay uplink in a resource block included in the resource block group defined by frequency F1-time T2.

In this manner, according to the allocation pattern 1, the uplink and the downlink are separated by frequency, and the relay link and the access link in the same direction are separated by time, and thus interference between each link can be suppressed.

Additionally, as shown in FIG. 7, one resource block group is formed from a plurality of resource blocks. Also, one resource block is formed from twelve subcarriers and a 0.5 ms slot (seven OFDM symbols), for example. This resource block is a unit of link allocation for each channel. Accordingly, a plurality of channels can be multiplexed in one resource block group in the time direction and the frequency direction.

Furthermore, according to the allocation pattern 1, the direct downlink (D-d) is allocated to the same resource block group as the relay downlink (R-d) and to the same resource block group as the access downlink (A-d). On the other hand, the direct uplink (D-u) is allocated to the same resource block group as the relay uplink (R-u) and to the same resource block group as the access uplink (A-u).

The reason for allocating the direct downlink to the same resource block group as another downlink and allocating the direct uplink to the same resource block group as another uplink will be described.

In LTE (Long Term Evolution), each mobile terminal 20 shares and uses the communication resources on a per-resource block basis. Also, each mobile terminal 20 shares a downlink resource block group for downlink and shares an uplink resource block group for uplink, according to the scheduling by the scheduler 156 of the base station 10.

That is, in LTE, the same resource block group is not shared between both the uplink and the downlink. This is because the base station and the mobile terminal normally have configurations not allowing the uplink and the downlink to be present in the same resource block group in a mixed manner.

On the other hand, when introducing the relay device 30, resources are preferably shared between the relay link and the direct link or between the access link and the direct link. Here, if operating in the same way as LTE, the scheduler 156 is capable of changing the resource distribution for the downlink in the downlink resource block group and the resource distribution for the uplink in the uplink resource block group.

Accordingly, in the present embodiment, the direct downlink is allocated to the same resource block group as another downlink and the direct uplink is allocated to the same resource block group as another uplink, as described above. Additionally, in contrast, it is difficult to share the resources by performing allocation as shown in FIG. 8.

Figure 8:
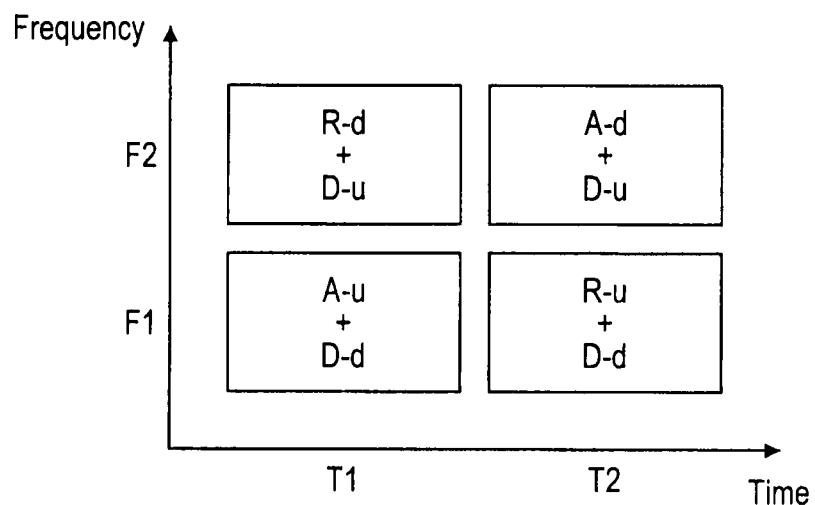
FIG. 8 is an explanatory diagram showing an example of allocation where uplinks and downlinks are present in a mixed manner in one resource block group.

FIG. 8 is an explanatory diagram showing an example of allocation where the uplink and the downlink are present in the same resource block group in a mixed manner. In the example shown in FIG. 8, the uplink and the downlink are present in a mixed manner in each of a resource block group defined by frequency F2-time T1, a resource block group defined by frequency F2-time T2, a resource block group defined by frequency F1-time T1, and a resource block group defined by frequency F1-time T2. However, sharing of such communication resources is difficult.

In the following, other allocation patterns 2 to 8 according to the present embodiment will be described with reference to FIGS. 9 to 15.

(Allocation Pattern 2)

Figure 9:
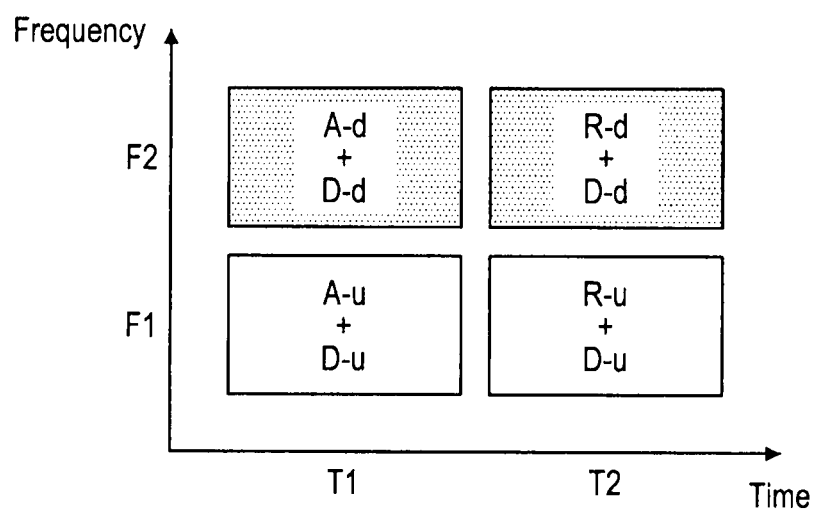
FIG. 9 is an explanatory diagram showing an allocation pattern 2 for each link.

FIG. 9 is an explanatory diagram showing an allocation pattern 2 for each link. As shown in FIG. 9, according to the allocation pattern 2, the access downlink (A-d) is allocated to the resource block group defined by frequency F2-time T1, the relay downlink (R-d) is allocated to the resource block group defined by frequency F2-time T2, the access uplink (A-u) is allocated to the resource block group defined by frequency F1-time T1, and the relay uplink (R-u) is allocated to the resource block group defined by frequency F1-time T2.

According to this allocation pattern 2, the relay device 30 transmits relay data held in the buffer 338 to the mobile terminal 20 via the access downlink in a resource block included in the resource block group defined by frequency F2- time Tl. Also, the base station 10 transmits data to the relay device 30 via the relay downlink in a resource block included in the resource block group defined by frequency F2- time T2.

Also, the mobile terminal 20 transmits data to the relay device 30 via the access uplink in a resource block included in the resource block group defined by frequency F1-time T1. Then, the relay device 30 receives the data transmitted via the access uplink, holds it in the buffer 338 as relay data, and transmits the relay data to the base station 10 via the relay uplink in a resource block included in the resource block group defined by frequency F1-time T2.

In this manner, according to the allocation pattern 2, the uplink and the downlink are separated by frequency, and the relay link and the access link in the same direction are separated by time, and thus interference between each link can be suppressed.

Furthermore, according to the allocation pattern 2, the direct downlink (D-d) is allocated to the same resource block group defined by frequency F2-time T2 as the relay downlink (R-d) and is allocated to the same resource block group defined by frequency F2-time T1 as the access downlink (A-d).

Similarly, the direct uplink (D-u) is allocated to the same resource block group defined by frequency F1-time T2 as the relay uplink (R-u) and the same resource block group defined by frequency F1-time T1 as the access uplink (A-u).

By performing link allocation according to the allocation pattern 2 in this manner, a resource block group (communication resources) can be shared between the relay link or the access link and the direct link.

(Allocation Pattern 3)

Figure 10:
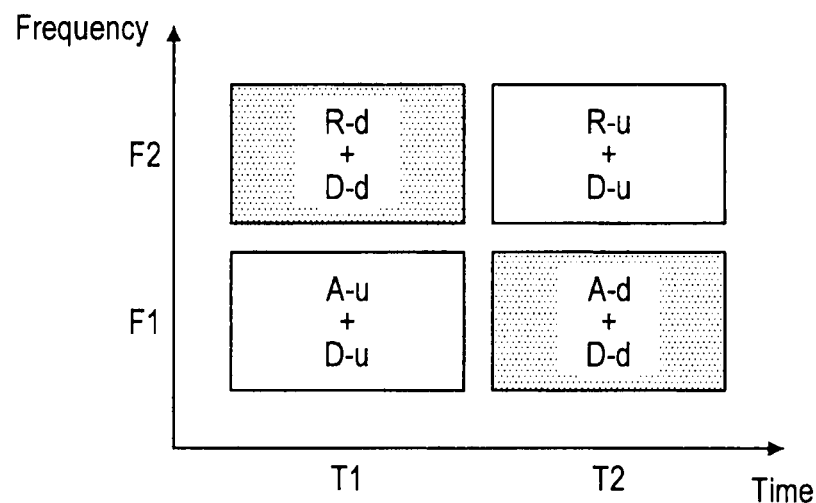
FIG. 10 is an explanatory diagram showing an allocation pattern 3 for each link.

FIG. 10 is an explanatory diagram showing an allocation pattern 3 for each link. As shown in FIG. 10, according to the allocation pattern 3, the relay downlink (R-d) is allocated to the resource block group defined by frequency F2-time T1, the access downlink (A-d) is allocated to the resource block group defined by frequency F1-time T2, the access uplink (A-u) is allocated to the resource block group defined by frequency F1-time T1, and the relay uplink (R-u) is allocated to the resource block group defined by frequency F2-time T2.

According to this allocation pattern 3, the base station 10 transmits data to the relay device 30 via the relay downlink in a resource block included in the resource block group defined by frequency F2-time T1. Then, the relay device 30 receives the data transmitted via the relay downlink, holds it in the buffer 338 as relay data, and then transmits the relay data to the mobile terminal 20 via the access downlink in a resource block included in the resource block group defined by frequency F1-time T2.

Furthermore, the mobile terminal 20 transmits data to the relay device 30 via the access uplink in a resource block included in the resource block group defined by frequency F1-time T1. Then, the relay device 30 receives the data transmitted via the access uplink, holds it in the buffer 338 as relay data, and then transmits the relay data to the base station 10 via the relay uplink in a resource block included in the resource block group defined by frequency F2-time T2.

In this manner, according to the allocation pattern 3, the uplink and the downlink are separated by frequency, and the relay link and the access link in the same direction are separated by both frequency and time, and thus interference between each link can be suppressed.

Furthermore, according to the allocation pattern 3, the direct downlink (D-d) is allocated to the same resource block group defined by frequency F2-time T1 as the relay downlink (R-d) and the same resource block group defined by frequency F1-time T2 as the access downlink (A-d).

Similarly, the direct uplink (D-u) is allocated to the same resource block group defined by frequency F2-time T2 as the relay uplink (R-u) and the same resource block group defined by frequency F1-time T1 as the access uplink (A-u).

By performing link allocation according to the allocation pattern 3 in this manner, a resource block group can be shared between the relay link or the access link and the direct link.

(Allocation Pattern 4)

Figure 11:
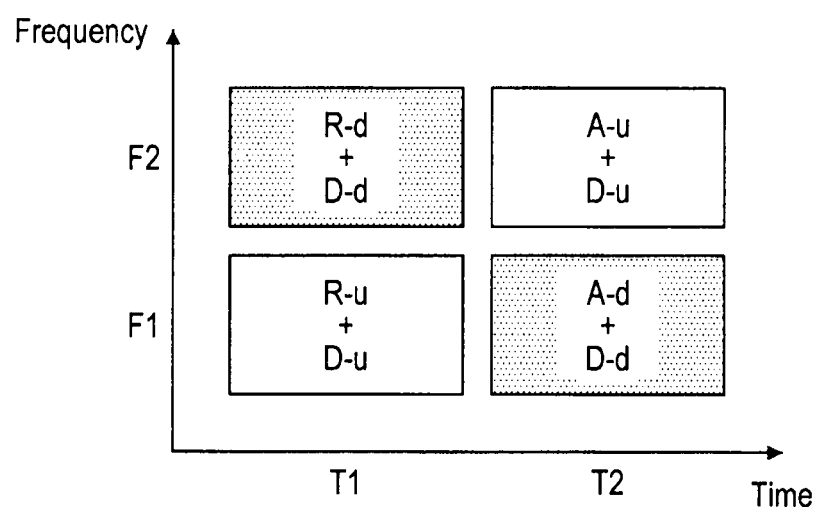
FIG. 11 is an explanatory diagram showing an allocation pattern 4 for each link.

FIG. 11 is an explanatory diagram showing an allocation pattern 4 for each link. As shown in FIG. 11, according to the allocation pattern 4, the relay downlink (R-d) is allocated to the resource block group defined by frequency F2-time T1, the access downlink (A-d) is allocated to the resource block group defined by frequency F1-time T2, the access uplink (A-u) is allocated to the resource block group defined by frequency F2-time T2, and the relay uplink (R-u) is allocated to the resource block group defined by frequency F1-time T1.

According to this allocation pattern 4, the base station 10 transmits data to the relay device 30 via the relay downlink in a resource block included in the resource block group defined by frequency F2-time T1. Then, the relay device 30 receives the data transmitted via the relay downlink, holds it in the buffer 338 as relay data, and then transmits the relay data to the mobile terminal 20 via the access downlink in a resource block included in the resource block group defined by frequency F1-time T2.

Furthermore, the relay device 30 transmits the relay data held in the buffer 338 to the base station 10 via the relay uplink in a resource block included in the resource block group defined by frequency F1-time T1. Also, the mobile terminal 20 transmits data to the relay device 30 via the access uplink in a resource block included in the resource block group defined by frequency F2-time T2.

In this manner, also according to the allocation pattern 4, the uplink and the downlink are separated by frequency, and the relay link and the access link in the same direction are separated by both frequency and time, and thus interference between each link can be suppressed.

Furthermore, according to the allocation pattern 4, the direct downlink (D-d) is allocated to the same resource block group defined by frequency F2-time T1 as the relay downlink (R-d) and the same resource block group defined by frequency F1-time T2 as the access downlink (A-d).

Similarly, the direct uplink (D-u) is allocated to the same resource block group defined by frequency F1-time T1 as the relay uplink (R-u) and the same resource block group defined by frequency F2-time T2 as the access uplink (A-u).

By performing link allocation according to the allocation pattern 4 in this manner, a resource block group can be shared between the relay link or the access link and the direct link.

(Allocation Pattern 5)

Figure 12:
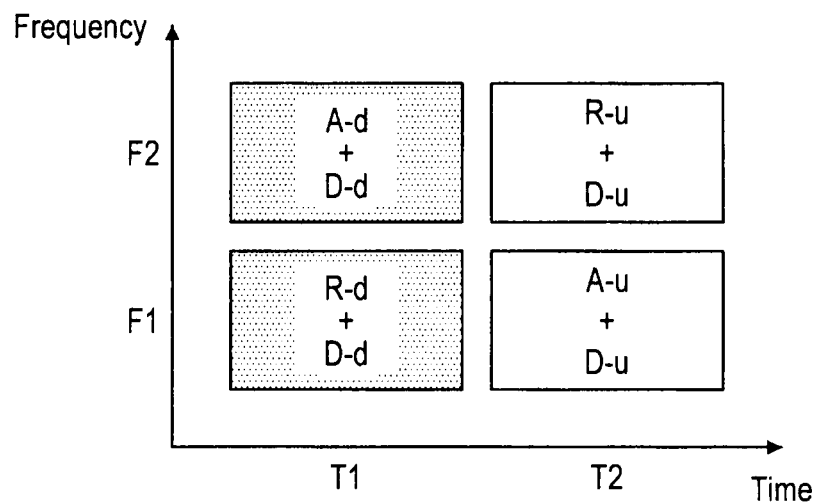
FIG. 12 is an explanatory diagram showing an allocation pattern 5 for each link.

FIG. 12 is an explanatory diagram showing an allocation pattern 5 for each link. As shown in FIG. 12, according to the allocation pattern 5, the relay downlink (R-d) is allocated to the resource block group defined by frequency F1-time T1, the access downlink (A-d) is allocated to the resource block group defined by frequency F2-time T1, the access uplink (A-u) is allocated to the resource block group defined by frequency F1-time T2, and the relay uplink (R-u) is allocated to the resource block group defined by frequency F2-time T2.

As described above, unlike the allocation patterns 1 to 4, according to the allocation pattern 5, the relay link and the access link are separated by frequency. Accordingly, the delay that occurs between the downlink of the relay link and the downlink of the access link can be reduced from a per-slot basis to a per-OFDM-symbol basis. Likewise, the delay that occurs between the uplink of the access link and the uplink of the relay link can be reduced from a per-slot basis to a per-OFDM-symbol basis.

Specifically, the base station 10 transmits data to the relay device 30 via the relay downlink in a resource block included in the resource block group defined by frequency F1-time T1. Then, the relay device 30 performs, using a resource block included in the resource block group defined by frequency F2-time T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink in a resource block included in the resource block group defined by frequency F1-time T2. Then, the relay device 30 performs, using a resource block included in the resource block group defined by frequency F2-time T2, decoding, buffering, encoding, and transmission to the base station 10 via the relay uplink of data received via the access uplink, with the amount of delay on a per-OFDM-symbol basis from the reception.

As described, according to the allocation pattern 5, the relay link and the access link are separated by frequency (FDD), and the uplink and the downlink are separated by time (TDD). Therefore, according to the allocation pattern 5, the delay that occurs between the base station 10 and the mobile terminal 20 can be reduced compared to the allocation patterns 1 to 4 where the relay link and the access link are separated by time, while suppressing the interference between each link.

Furthermore, according to the allocation pattern 5, the direct downlink (D-d) is allocated to the same resource block group defined by frequency F1-time T1 as the relay downlink (R-d) and the same resource block group defined by frequency F2-time T1 as the access downlink (A-d).

Similarly, the direct uplink (D-u) is allocated to the same resource block group defined by frequency F2-time T2 as the relay uplink (R-u) and the same resource block group defined by frequency F1-time T2 as the access uplink (A-u).

By performing link allocation according to the allocation pattern 5 in this manner, a resource block group can be shared between the relay link or the access link and the direct link.

(Allocation Pattern 6)

Figure 13:
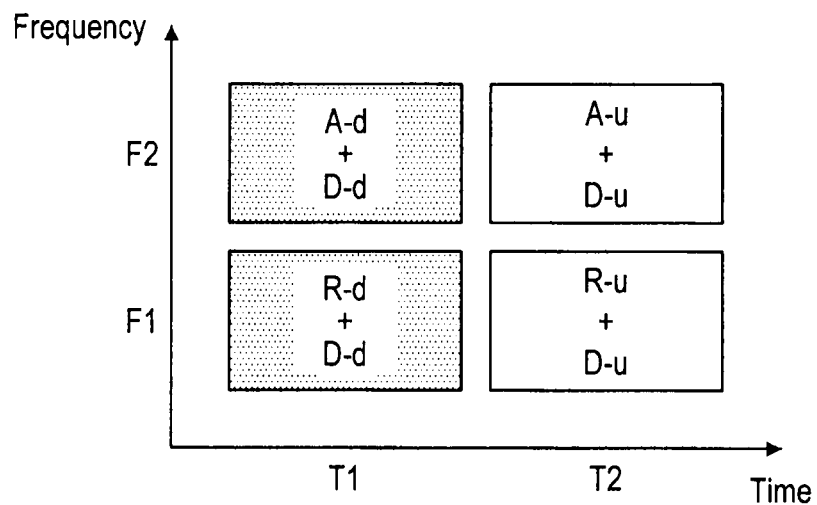
FIG. 13 is an explanatory diagram showing an allocation pattern 6 for each link.

FIG. 13 is an explanatory diagram showing an allocation pattern 6 for each link. As shown in FIG. 13, according to the allocation pattern 6, the relay downlink (R-d) is allocated to the resource block group defined by frequency F1-time T1, the access downlink (A-d) is allocated to the resource block group defined by frequency F2-time T1, the access uplink (A-u) is allocated to the resource block group defined by frequency F2-time T2, and the relay uplink (R-u) is allocated to the resource block group defined by frequency F1-time T2.

In this manner, also with the allocation pattern 6, as with the allocation pattern 5, the relay link and the access link are separated by frequency. Accordingly, the delay that occurs between the downlink of the relay link and the downlink of the access link can be reduced from a per-slot basis to a per-OFDM-symbol basis. Likewise, the delay that occurs between the uplink of the access link and the uplink of the relay link can be reduced from a per-slot basis to a per-OFDM-symbol basis.

Specifically, the base station 10 transmits data to the relay device 30 via the relay downlink in a resource block included in the resource block group defined by frequency F1-time T1. Then, the relay device 30 performs, using a resource block included in the resource block group defined by frequency F2-time T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink in a resource block included in the resource block group defined by frequency F2-time T2. Then, the relay device 30 performs, using a resource block included in the resource block group defined by frequency F1-time T2, decoding, buffering, encoding, and transmission to the base station 10 via the relay uplink of data received via the access uplink, with the amount of delay on a per-OFDM-symbol basis from the reception.

As described, according to the allocation pattern 6, the relay link and the access link are separated by frequency (FDD), and the uplink and the downlink are separated by both time and frequency (TDD). Therefore, according to the allocation pattern 6, the delay that occurs between the base station 10 and the mobile terminal 20 can be reduced compared to the allocation patterns 1 to 4 where the relay link and the access link are separated by time, while suppressing the interference between each link.

Furthermore, according to the allocation pattern 6, the direct downlink (D-d) is allocated to the same resource block group defined by frequency F1-time T1 as the relay downlink (R-d) and the same resource block group defined by frequency F2-time T1 as the access downlink (A-d).

Similarly, the direct uplink (D-u) is allocated to the same resource block group defined by frequency F1-time T2 as the relay uplink (R-u) and the same resource block group defined by frequency F2-time T2 as the access uplink (A-u).

By performing link allocation according to the allocation pattern 6 in this manner, a resource block group can be shared between the relay link or the access link and the direct link.

(Allocation Pattern 7)

Figure 14:
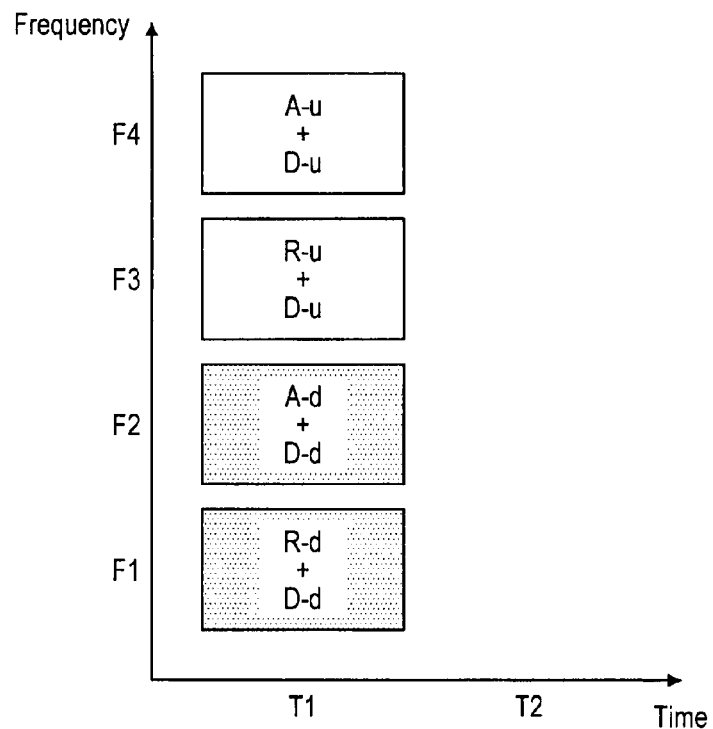
FIG. 14 is an explanatory diagram showing an allocation pattern 7 for each link.

FIG. 14 is an explanatory diagram showing an allocation pattern 7 for each link. As shown in FIG. 14, according to the allocation pattern 7, the relay downlink (R-d) is allocated to the resource block group defined by frequency F1- time T1, the access downlink (A-d) is allocated to the resource block group defined by frequency F2- time Tl, the relay uplink (R-u) is allocated to the resource block group defined by frequency F3- time Tl, and the access (A-u) is allocated to the resource block group defined by frequency F4- time Tl.

In this manner, according to the allocation pattern 7, the relay link and the access link are separated by frequency, and the uplink and the downlink are also separated by frequency. Therefore, according to the allocation pattern 7, as with the allocation patterns 5 and 6, the delay at the relay device 30 can be reduced to a per-OFDM-symbol basis, and also, to use one of the uplink and the downlink, it is not necessary to wait for the completion of the other.

Specifically, the base station 10 transmits data to the relay device 30 via the relay downlink in a resource block included in the resource block group defined by frequency F1-time T1. Then, the relay device 30 performs, using a resource block included in the resource block group defined by frequency F2-time T1, decoding, buffering, encoding, and transmission to the mobile terminal 20 via the access downlink of data received via the relay downlink, with the amount of delay on a per-OFDM-symbol basis from the reception. Additionally, the amount of delay may be variable between one OFDM symbol to a plurality of OFDM symbols.

Also, the mobile terminal 20 transmits data to the relay device 30 via the access uplink in a resource block included in the resource block group defined by frequency F4- time Tl. Then, the relay device 30 performs, using a resource block included in the resource block group defined by frequency F3- time Tl, decoding, buffering, encoding, and transmission to the base station 10 via the relay uplink of data received via the access uplink, with the amount of delay on a per-OFDM-symbol basis from the reception.

Furthermore, according to the allocation pattern 7, the direct downlink (D-d) is allocated to the same resource block group defined by frequency F1-time T1 as the relay downlink (R-d) and the same resource block group defined by frequency F2-time T1 as the access downlink (A-d).

Similarly, the direct uplink (D-u) is allocated to the same resource block group defined by frequency F3-time T1 as the relay uplink and the same resource block group defined by frequency F4-time T1 as the access uplink (A-u).

By performing link allocation according to the allocation pattern 7 in this manner, a resource block group can be shared between the relay link or the access link and the direct link.

(Allocation Pattern 8)

Figure 15:
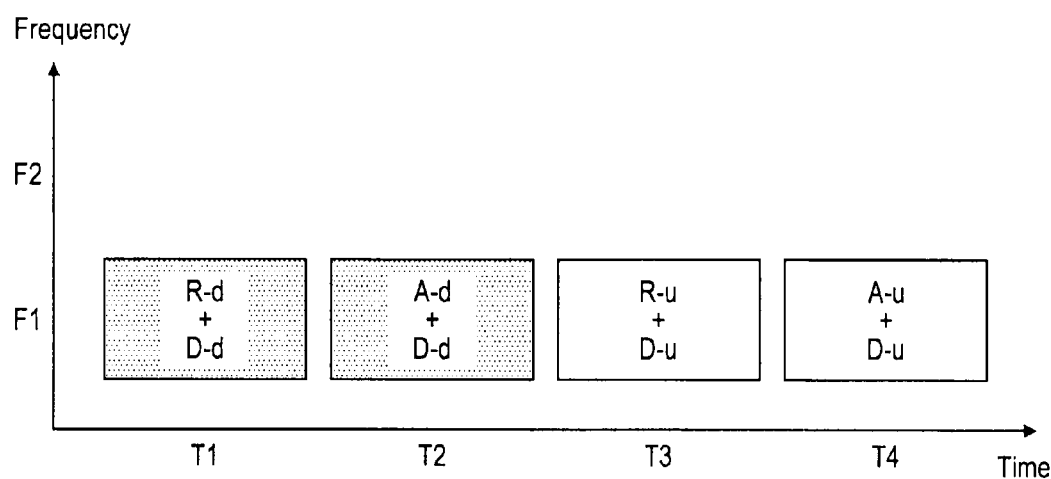
FIG. 15 is an explanatory diagram showing an allocation pattern 8 for each link.

FIG. 15 is an explanatory diagram showing an allocation pattern 8 for each link. As shown in FIG. 15, according to the allocation pattern 8, the relay downlink (R-d) is allocated to the resource block group defined by frequency Fl- time T1, the access downlink (A-d) is allocated to the resource block group defined by frequency F1- time T2, the relay uplink (R-u) is allocated to the resource block group defined by frequency F1- time T3, and the access uplink (A-u) is allocated to the resource block group defined by frequency F1- time T4.

In this manner, according to the allocation pattern 8, the relay link and the access link are separated by time, and the uplink and the downlink are also separated by time. Therefore, according to the allocation pattern 8, the number of frequencies to be used is small, but the delay characteristics are deteriorated compared to other allocation patterns.

Specifically, according to the allocation pattern 8, the base station 10 transmits data to the relay device 30 via the relay downlink in a resource block included in the resource block group defined by frequency F1- time T1. Then, the relay device 30 receives the data transmitted via the relay downlink, holds it in the buffer 338 as relay data, and then transmits the relay data to the mobile terminal 20 via the access downlink in a resource block included in the resource block group defined by frequency F1- time T2.

Also, the mobile terminal 20 transmits data to the relay device 30 via the access uplink in a resource block included in the resource block group defined by frequency F1-time T4. Then, the relay device 30 receives the data transmitted via the access uplink, holds it in the buffer 338 as relay data, and then transmits the relay data to the base station 10 via the relay uplink in a resource block included in the resource block group defined by frequency F1- time T3.

Furthermore, according to the allocation pattern 8, the direct downlink (D-d) is allocated to the same resource block group defined by frequency F1-time T1 as the relay downlink (R-d) and the same resource block group defined by frequency F1-time T2 as the access downlink (A-d).

Similarly, the direct uplink (D-u) is allocated to the same resource block group defined by frequency F1-time T3 as the relay uplink (R-u) and the same resource block group defined by frequency F1-time T4 as the access uplink (A-u).

By performing link allocation according to the allocation pattern 8 in this manner, a resource block group can be shared between the relay link or the access link and the direct link.

<5. Operation of Base Station>

In the foregoing, the configuration of the base station 10 according to the present embodiment has been described. Next, the flow of link allocation by the base station 10 will be described with reference to FIG. 16 as the operation of the base station 10.

Figure 16:
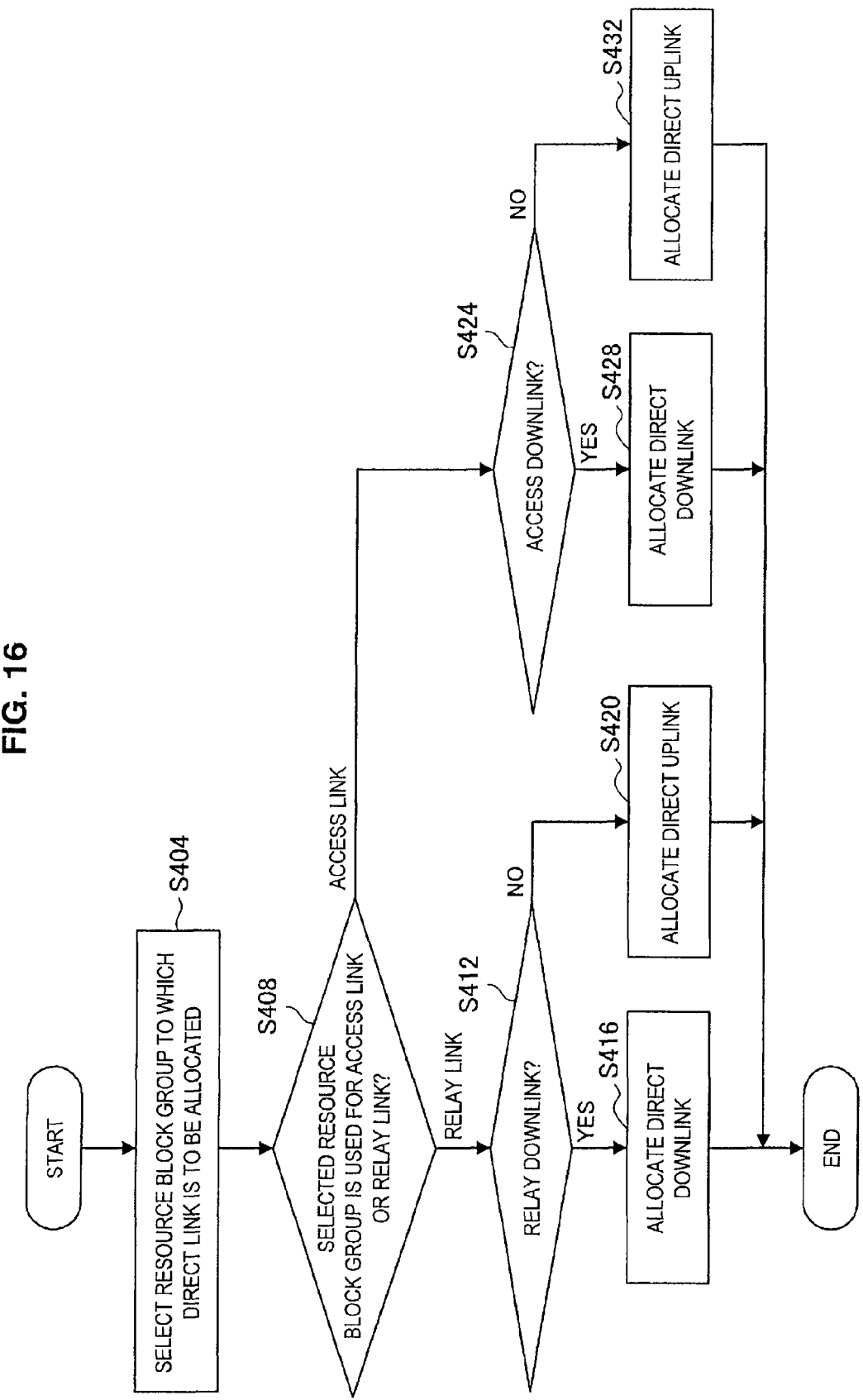
FIG. 16 is a flow chart showing the flow of link allocation by a base station.

FIG. 16 is a flow chart showing the flow of link allocation by the base station 10. First, the scheduler 156 of the base station 10 selects a resource block group to which the direct link will be allocated (S404). Next, the scheduler 156 decides whether the selected resource block group is used for the access link or the relay link (S408).

Then, in the case the selected resource block group is used for the relay link and further for the relay downlink (S412), the scheduler 156 allocates the direct downlink to the selected resource block group (S416). On the other hand, in the case the selected resource block group is used for the relay link and further for the relay uplink (S412), the scheduler 156 allocates the direct uplink to the selected resource block group (S420).

Furthermore, in the case the selected resource block group is used for the access link and further for the access downlink (S424), the scheduler 156 allocates the direct downlink to the selected resource block group (S428). On the other hand, in the case the selected resource block group is used for the access link and further for the access uplink (S424), the scheduler 156 allocates the direct uplink to the selected resource block group (S432).

<6. Summary>

As described above, the scheduler 156 of the base station 10 according to the present embodiment allocates the direct uplink to the resource block included in the same resource block group as the relay uplink or the access uplink. Similarly, the scheduler 156 allocates the direct downlink to the resource block included in the same resource block group as the relay downlink or the access downlink. According to such a configuration, a resource block group can be shared between the relay link or the access link and the direct link.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the steps of the processing of the base station 10 of the present specification do not necessarily have to be processed chronologically according to the order described as the sequence chart. For example, the steps of the processing of the base station 10 may be processed according to an order different from the order shown as the flow chart or may be processed in parallel.

The invention claimed is:

1. A base station comprising:
   a communication interface configured to communicate with a mobile terminal via a relay link between the base station and a relay device and an access link between the relay device and the mobile terminal; and
   circuitry configured to
      allocate a resource block included in a first resource block group to a downlink of the relay link;
      allocate a resource block included in a second resource block group to a downlink of the access link;
      allocate a resource block included in a third resource block group to an uplink of the access link; and
      allocate a resource block included in a fourth resource block group to an uplink of the relay link, wherein
   the first resource block group is same in frequency but different in time from the second resource block group, and is same in time but different in frequency from the third resource block group, and
   the fourth resource block group is same in time but different in frequency from the second resource block group, and is same in frequency but different in time from the third resource block group.

2. A base station comprising:
   a communication interface configured to communicate with a mobile terminal via a relay link between the base station and a relay device and an access link between the relay device and the mobile terminal; and
   circuitry configured to
      allocate a resource block included in a first resource block group to a downlink of the relay link;
      allocate a resource block included in a second resource block group to a downlink of the access link;
      allocate a resource block included in a third resource block group to an uplink of the access link; and
      allocate a resource block included in a fourth resource block group to an uplink of the relay link, wherein
   the first resource block group is same in frequency but different in time from the second resource block group, and is same in time but different in frequency from the fourth resource block group, and the third resource block group is same in time but different in frequency from the second resource block group, and is same in frequency but different in time from the fourth resource block group.

3. A base station comprising:

a communication interface configured to communicate with a mobile terminal via a relay link between the base station and a relay device and an access link between the relay device and the mobile terminal; and circuitry configured to allocate a resource block included in a first resource block group to a downlink of the relay link;

allocate a resource block included in a second resource block group to a downlink of the access link;

allocate a resource block included in a third resource block group to an uplink of the access link; and allocate a resource block included in a fourth resource block group to an uplink of the relay link, wherein the first resource block group is same in frequency but different in time from the fourth resource block group, and is same in time but different in frequency from the third resource block group, and the second resource block group is same in time but different in frequency from the fourth resource block group, and is same in frequency but different in time from the third resource block group.

4. A base station comprising:

a communication interface configured to communicate with a mobile terminal via a relay link between the base station and a relay device and an access link between the relay device and the mobile terminal; and circuitry configured to allocate a resource block included in a first resource block group to a downlink of the relay link;

allocate a resource block included in a second resource block group to a downlink of the access link;

allocate a resource block included in a third resource block group to an uplink of the access link; and allocate a resource block included in a fourth resource block group to an uplink of the relay link, wherein the first resource block group is same in frequency but different in time from the third resource block group, and is same in time but different in frequency from the fourth resource block group, and the second resource block group is same in time but different in frequency from the third resource block group, and is same in frequency but different in time from the fourth resource block group.

5. A base station comprising:

a communication interface configured to communicate with a mobile terminal via a relay link between the base station and a relay device and an access link between the relay device and the mobile terminal; and circuitry configured to allocate a resource block included in a first resource block group to a downlink of the relay link;

allocate a resource block included in a second resource block group to a downlink of the access link;

allocate a resource block included in a third resource block group to an uplink of the access link; and allocate a resource block included in a fourth resource block group to an uplink of the relay link, wherein the first resource block group is same in frequency but different in time from the third resource block group, and is same in time but different in frequency from the second resource block group, and the fourth resource block group is same in time but different in frequency from the third resource block group, and is same in frequency but different in time from the second resource block group.

6. A base station comprising:

a communication interface configured to communicate with a mobile terminal via a relay link between the base station and a relay device and an access link between the relay device and the mobile terminal; and circuitry configured to allocate a resource block included in a first resource block group to a downlink of the relay link;

allocate a resource block included in a second resource block group to a downlink of the access link;

allocate a resource block included in a third resource block group to an uplink of the access link; and allocate a resource block included in a fourth resource block group to an uplink of the relay link, wherein the first resource block group is same in frequency but different in time from the fourth resource block group, and is same in time but different in frequency from the second resource block group, and the third resource block group is same in time but different in frequency from the fourth resource block group, and is same in frequency but different in time from the second resource block group.

7. A base station comprising:

a communication interface configured to communicate with a mobile terminal via a relay link between the base station and a relay device and an access link between the relay device and the mobile terminal; and circuitry configured to allocate a resource block included in a first resource block group to a downlink of the relay link;

allocate a resource block included in a second resource block group to a downlink of the access link;

allocate a resource block included in a third resource block group to an uplink of the access link; and allocate a resource block included in a fourth resource block group to an uplink of the relay link, wherein the first resource block group, the second resource block group, the third resource block group, and the fourth resource block group are same in time but different in frequency.

* * * * *